(12) United States Patent
Tezuka et al.

(10) Patent No.: US 10,042,346 B2
(45) Date of Patent: Aug. 7, 2018

(54) NUMERICAL CONTROL DEVICE PROVIDED WITH HEAT RADIATION CHARACTERISTIC ESTIMATION PART

(71) Applicant: FANUC CORPORATION, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 465 days.

(21) Appl. No.: 14/635,461

(22) Filed: Mar. 2, 2015

(65) Prior Publication Data
US 2015/0248123 A1  Sep. 3, 2015

(30) Foreign Application Priority Data
Mar. 3, 2014 (JP) .................. 2014-040808

(51) Int. Cl.
*G05B 19/18* (2006.01)
*G05D 23/19* (2006.01)
(Continued)

(52) U.S. Cl.
CPC ........... *G05B 19/18* (2013.01); *G05B 19/406* (2013.01); *G05D 23/19* (2013.01);
(Continued)

(58) Field of Classification Search
CPC ........... C12Q 1/6886; C12Q 2600/106; C12Q 2600/118; C12Q 2600/156; G05B 19/18;
(Continued)

(56) References Cited

U.S. PATENT DOCUMENTS 6,291,959 B1   9/2001  Yoshida et al.
6,377,880 B1*  4/2002  Kato .................. B60K 6/485
                                                180/65.26
(Continued)

FOREIGN PATENT DOCUMENTS

CN       1112309 A     11/1995
CN     101578759 A     11/2009
(Continued)

*Primary Examiner* — Charles Kasenge
(74) *Attorney, Agent, or Firm* — Hauptman Ham, LLP (57) ABSTRACT

A numerical control device, in a motor drive system which drives a motor part which has a cooling fan motor and is provided with the numerical control device to drive the motor part, which acquires the temperature of the component elements of the motor part from the temperature detectors, ambient temperature, input energy to the component elements, and output energy from the component elements, estimates the heat radiation characteristic of the component elements from the data of the temperature of the component elements, ambient temperature, and input/output energy, compares the estimated value of the heat radiation characteristic of the component elements with a normal value, judges that the cooling fan motor is abnormal when the heat radiation characteristic is below the normal value, and thereby prevents trouble due to overheating of the component elements of the motor part.

6 Claims, 5 Drawing Sheets

(51) Int. Cl.
*G05B 19/406* (2006.01)
*H02P 29/60* (2016.01)

(52) U.S. Cl.
CPC ............ *G05B 2219/37429* (2013.01); *G05B 2219/49052* (2013.01); *H02P 29/60* (2016.02)

(58) Field of Classification Search
CPC ........ G05B 19/406; G05B 2219/37429; G05B 2219/49052; G05D 23/19; G06F 19/22; H02P 29/60; C40B 30/02
USPC ........................................................ 506/8, 16
See application file for complete search history.

(56) References Cited

U.S. PATENT DOCUMENTS

| | | | |
|---|---|---|---|
| 2007/0056185 A1 | 3/2007 | Isono | |
| 2010/0111134 A1* | 5/2010 | Matsumoto | H02M 1/32 |
| | | | 374/43 |
| 2011/0101904 A1* | 5/2011 | Sakamoto | B62D 5/0481 |
| | | | 318/473 |
| 2012/0249039 A1* | 10/2012 | Usami | G01K 7/42 |
| | | | 318/490 |
| 2014/0285131 A1 | 9/2014 | Sasaki | |

FOREIGN PATENT DOCUMENTS

| | | |
|---|---|---|
| DE | 102009013043 A1 | 9/2009 |
| JP | 2000-166289 A | 6/2000 |
| JP | 2005-009425 A | 1/2005 |
| JP | 2005-102430 A | 4/2005 |
| JP | 2006-254549 A | 9/2006 |
| JP | 3902710 B2 | 4/2007 |
| JP | 2008-35659 A | 2/2008 |
| JP | 2008-054440 A | 3/2008 |
| JP | 4526418 B2 | 8/2010 |
| JP | 2012-115081 A | 6/2012 |
| JP | 2014-187789 A | 10/2014 |
| JP | 2015-167436 A | 9/2015 |

* cited by examiner

NUMERICAL CONTROL DEVICE PROVIDED WITH HEAT RADIATION CHARACTERISTIC ESTIMATION PART

RELATED APPLICATIONS

The present application claims priority to Japanese Application Number 2014-040808, filed Mar. 3, 2014, the disclosure of which is hereby incorporated by reference herein in its entirety.

BACKGROUND OF THE INVENTION

1. Field of the Invention

The present invention relates to a numerical control device which is provided with a heat radiation characteristic estimation part. The present invention more particularly relates to a numerical control device in a motor drive system which is provided with a cooling device and drives at least one motor using such a numerical control device wherein the numerical control device is provided with a heat radiation characteristic estimation part which can discover abnormalities in a cooling device of a component element which forms a portion of a motor part of the motor drive system.

2. Description of the Related Art

A machine tool system has a motor for each drive shaft of the machine tool and drives these motors by a motor drive system. The motor drive system is provided with a motor part and a numerical control device which controls the motor part. The motors in the motor part are controlled by the numerical control device by numerical values. Further, the operations of the motors are monitored by the numerical control device of the motor drive system. Further, the motor part of the motor drive system is provided with an input power source, converter, and inverters for making the motors operate.

On the other hand, in the motor part of a motor drive system in which a converter or inverter is used to control a motor, the heat generated by the converter or inverter and the heat generated by the motor cause the temperatures of the converter, inverter, and motor which form the motor part to rise. Further, if the temperatures of the converter, inverter, and motor rise, these component elements are damaged by heat and the motor drive system can no longer normally operate. For this reason, the converter, inverter, and motor are provided with a cooling device for preventing a temperature rise. The cooling device is generally an air-cooling type cooling device which uses cooling fins. In an air-cooling type cooling device, the cooling fan is driven by a fan motor to generate cooling air which cools the insides of the converter, inverter, and motor. Further, in such an air-cooling type cooling device, for preventive maintenance, a speed sensor which is attached to the fan motor is used to monitor for drop in speed of the fan or for the state where the fan stops and to prevent temperature rises in the converter, inverter, and motor.

In this regard, in such a method for preventing a rise in temperature, a speed sensor was separately required for detecting the rotational speed of the fan motor. On top of this, a temperature rise in the converter, inverter, and motor due to a drop in the cooling efficiency due to factors other than the drop in rotational speed of the fan motor could not be detected. On the other hand, in a control system using a motor, an overheating protection device for preventing overheating of the motor is disclosed in Japanese Patent Publication No. 2008-54440A. The device which is described in Japanese Patent Publication No. 2008-54440A is an overheating protection device in an electronic power steering system. This estimates the temperature from the heat generation characteristic and the heat radiation characteristic based on the difference in the heat capacities of several components (motor and controller) and limits the current which flows to the motor to protect the motor and the devices around the motor from overheating. Further, in the same field of numerical control devices, the art of increasing the acceleration/deceleration constant or decreasing the feed speed to prevent in advance overheating of the feed shaft motor of the machine tool to protect the machine when the amount of heat generated by the motor exceeds the allowable amount of heat generation is disclosed in Japanese Patent No. 3902710B2.

However, the control device of the motor which is disclosed in Japanese Patent Publication No. 2008-54440A estimates the temperature of the motor and the temperature of the motor controller from the difference between the amount of heat generated due to the motor current and the amount of heat radiated, so has the issue that since there is no temperature detector, it is not possible to precisely estimate the amount of heat radiated. Further, in the numerical control machine tool which is disclosed in Japanese Patent No. 3902710B2, operation of the driving means is suppressed when the allowable amount of heat generated which is determined by calculation of the temperature of the driving means from the current to the driving means or torque command data is exceeded by the total amount of heat generated which is found from operation based on the current to the driving means or torque command data. However, the numerical control machine tool which is disclosed in Japanese Patent No. 3902710B2 has no temperature detector, so there is the issue that it is not possible to precisely estimate the temperature of the driving means (heat radiation characteristic).

SUMMARY OF INVENTION

In one aspect, the present invention has as its object the provision of a numerical control device in a motor drive system which is provided with a numerical control device as a control part and which drives a motor part, wherein the numerical control device can discover abnormalities in a cooling device of component elements based on changes in a heat radiation characteristic of component elements which is estimated from the current which runs through the component elements at the motor part, the temperature, and the ambient temperature.

According to one aspect of the present invention, there is provided a numerical control device which is provided at a motor drive system which drives at least one motor, which numerical control device is provided with a temperature acquisition part which acquires a temperature of component elements of the motor drive system from a temperature detector which is set in the motor drive system, an ambient temperature acquisition part which acquires an ambient temperature of the motor drive system from a temperature detector which is set at the motor drive system, an input energy acquisition part which acquires an input energy to the component elements, an output energy acquisition part which acquires an output energy from the component elements, a heat radiation characteristic estimation part which estimates a heat radiation characteristic of the component elements from the temperature of the component elements, the ambient temperature, the input energy, and the output energy, and a heat radiation characteristic outputting part which outputs the estimated heat radiation characteristic of the component elements as a normal/abnormal judgment signal of the cooling device.

According to the numerical control device of one aspect of the present invention, there is provided a motor drive system which is provided with a numerical control device whereby it becomes possible to discover abnormalities of the cooling device of the component elements and prevent a drop in performance and breakdown of the component elements from the change in the heat radiation characteristic of the component elements estimated from the operating environment of the component elements at a motor part of the motor drive system.

BRIEF DESCRIPTION OF THE DRAWINGS

The present invention will be understood more clearly by referring to the drawings attached below.

DETAILED DESCRIPTION

Below, referring to the drawings, a numerical control device which has a heat radiation characteristic estimation part will be explained. However, it should be understood that the present invention is not limited to the drawings or the embodiments which are explained below. In the figures, the same component elements are assigned the same reference notations.

Figure 1:
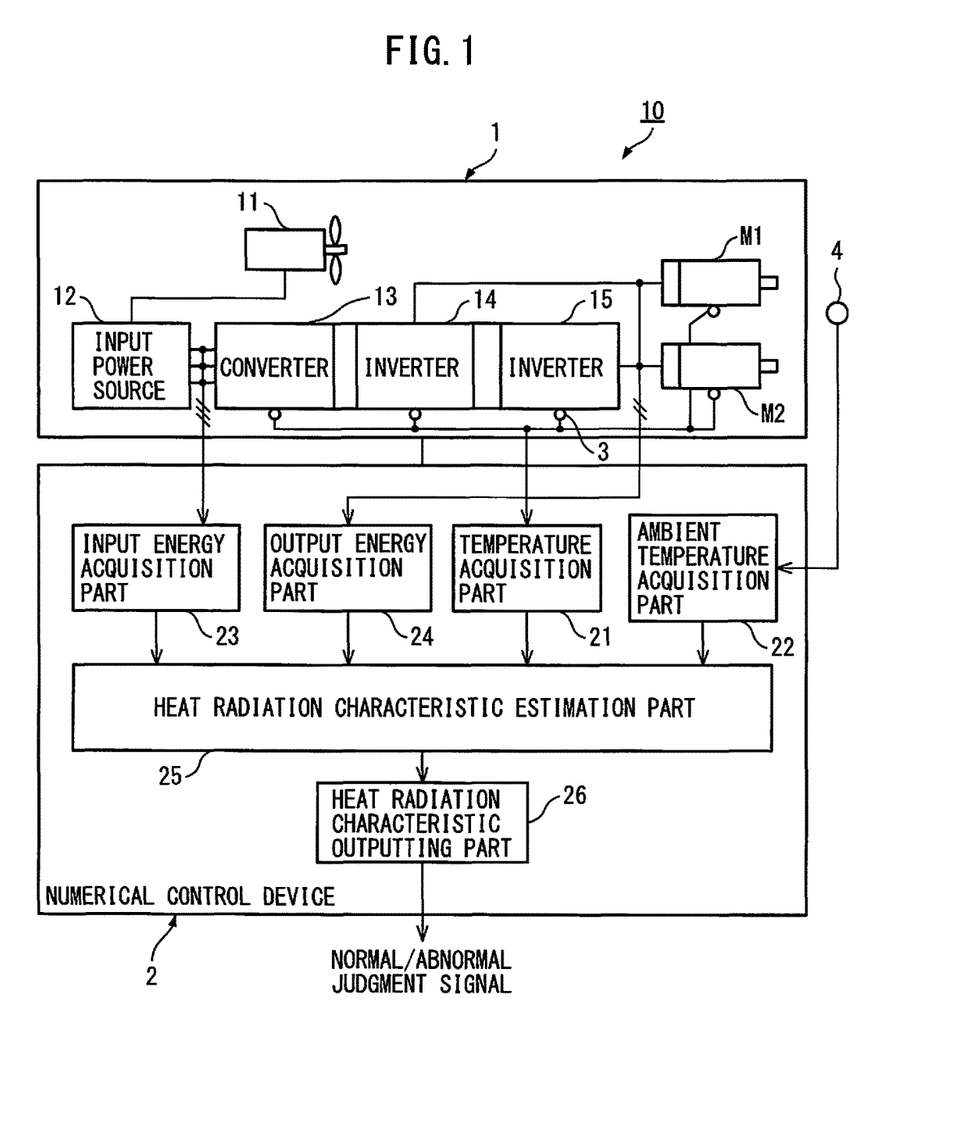
FIG. 1 is a block diagram of a motor drive system which is provided with a numerical control device of a first embodiment of the present invention.

FIG. 1 shows the configuration of a motor drive system 10 which is provided with a numerical control device 2 of a first embodiment of the present invention. The motor drive system 10 is provided with a motor part 1 and a control part which controls the motor part 1 constituted by the numerical control device 2. At the motor part 1 of the first embodiment which is shown in FIG. 1, two motors M1 and M2 are shown. The motors M1 and M2 are for example servo motors or spindle motors.

The motor part 1 has an input power source 12 which is connected to a three-phase AC power source. A three-phase alternating current is input to a converter 13 which is connected to the input power source 12 to be converted to direct current. The output of the converter 13 is input to the inverters 14 and 15 which drive the two motors M1 and M2 where it is converted to the desired alternating currents for control of the drive of the two motors M1 and M2.

The component elements of the motor part 1 (motors M1 and M2, inverters 14 and 15, and converter 13) generate heat in their operations whereby their internal temperatures rise. If the internal temperatures of the component elements excessively rise, these component elements become damaged by heat and easily break down, so the insides of the component elements have to be cooled by an air-cooling type or liquid-cooling type cooling device so that the temperatures do not excessively rise. The reason is that motors are easily reduced in magnetization if a predetermined temperature is exceeded or an endurance temperature is set for each component forming the motor, so if the insides of the motors and other component elements exceed a predetermined temperature, there is a possibility of breakdown.

In particular, a motor with a small surface area for discharging heat, a large value of winding resistance, and a large flow of current generates a large amount of heat, so cannot be naturally cooled by air and has to be forced air-cooled by a fan or liquid-cooled using a liquid for active discharge of heat. The same is true for the case of the inverters or the converter. The circuit elements of the inverters or converter generate heat when run through by current, so the inverters and converter also require active discharge of heat by forced air-cooling or liquid cooling corresponding to the amounts of heat generated.

Air-cooling type cooling devices include types with fans and types without fans depending on the heat generating conditions of the component elements. In the embodiment which is shown in FIG. 1, a cooling fan motor 11 is provided as the air-cooling type cooling device. The cooling fan motor 11 is driven by current from the input power source 12. On the other hand, for liquid-cooling type cooling devices, while not illustrated, there are water-cooling type and oil-cooling type cooling devices. These can directly cool the component elements, so compared with air-cooling, the cooling ability becomes higher, but the installation cost also becomes higher.

The present invention, for the purpose of preventive maintenance (protection against overheating), provides a numerical control device which can prevent in advance trouble due to overheating of the component elements of the motor part 1 (motors, inverters, and converter). That is, when the cooling device of the component elements is an air-cooling type, a drop in the heat radiation characteristic due to a drop in speed of the fan of the cooling fan motor is prevented, while when it is a liquid-cooling type, a drop in the heat radiation characteristic due to a slowdown in circulation of the cooling medium is prevented. The heat radiation characteristic is grasped in advance as a numerical value and trouble of the component elements due to overheating is prevented.

Here, using as an example the drop in speed of the fan of a cooling fan motor 11 which is provided at the motor part 1 of the embodiment which is shown in FIG. 1, the case of obtaining a grasp of the drop in the heat radiation characteristic of the cooling device by a numerical value in advance and preventing trouble due to overheating of the motor part 1 will be explained. In the embodiment which is shown in FIG. 1, the numerical control device 2 which controls the motor part 1 is provided with a temperature acquisition part 21, ambient temperature acquisition part 22, input energy acquisition part 23, output energy acquisition part 24, heat radiation characteristic estimation part 25, and heat radiation characteristic outputting part 26. Further, the motor drive system 10 is provided with a first temperature detector 3 which detects the temperature of the component elements and a second temperature detector 4 which detects the ambient temperature of the motor part 1.

Figure 2:
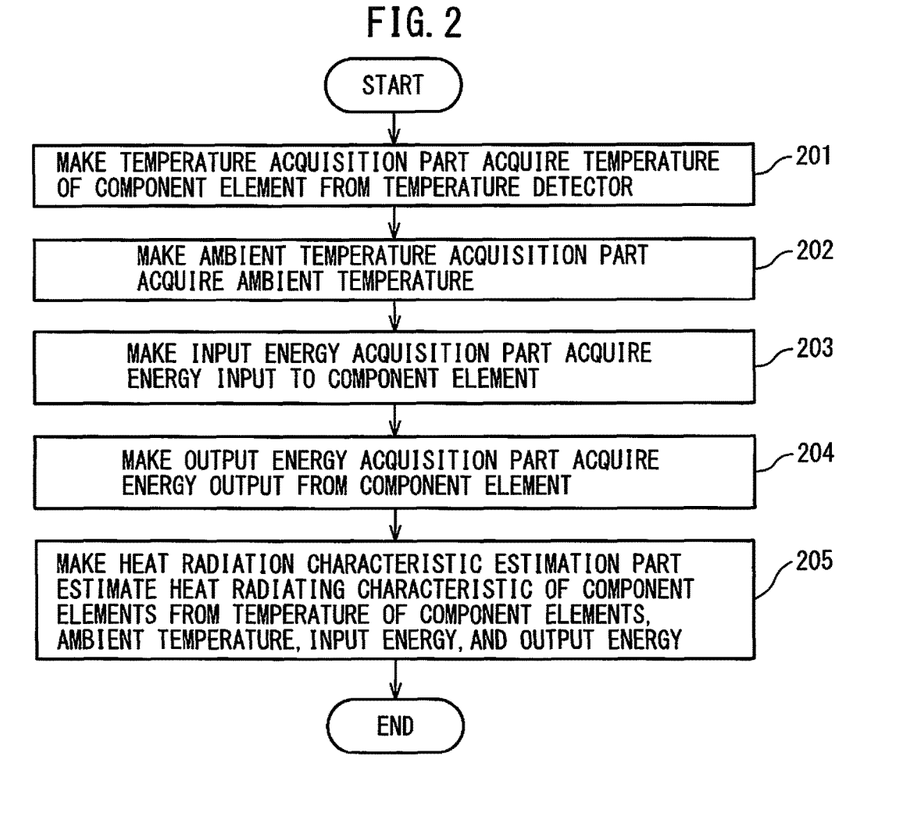
FIG. 2 is a flow chart which shows an example of the operation of a heat radiation characteristic estimation part of the numerical control device which is shown in FIG. 1.

Here, referring to FIG. 2 jointly with FIG. 1, the operations of the temperature acquisition part 21, ambient temperature acquisition part 22, input energy acquisition part 23, output energy acquisition part 24, heat radiation characteristic estimation part 25, and heat radiation characteristic outputting part 26 will be explained in the order of the operations. The temperature acquisition part 21 acquires the temperature of the component elements of the motor part 1 (motors M1 and M2, inverters 14 and 15, and converter 13) from the first temperature detector 3 which is set at the motor drive system 10 (step 201). Further, the ambient temperature acquisition part 22 acquires the ambient temperature of the motor part 1 from the second temperature detector 4 which is set at the motor drive system 10 (step 202).

The input energy acquisition part 23 acquires the energy which is input to the above-mentioned component elements (step 203). The energy which is input to the converter 13 is the energy which is output from the input power source 12 and input to the converter 13. For this reason, at the input energy acquisition part 23, the output of the input power source 12 is pulled in at three signal lines. The energy which is input to the inverters 14 and 15 is the energy which is output from the converter 13 and input to the inverters 14 and 15. For this reason, at the input energy acquisition part 23, the output of the converter 13 is pulled in from not shown signal lines which are provided in front of the inverters 14 and 15 or inside them. The energy which is input to the motors M1 and M2 is the energy which is output from the inverters 14 and 15 and input to the motors M1 and M2. For this reason, at the input energy acquisition part 23, the outputs of the inverters 14 and 15 are pulled in from not shown signal lines which are provided in front of the motors M1 and M2.

On the other hand, the output energy acquisition part 24 acquires the energy which is output from the component elements (step 204). The energy which is output from the converter 13, if excluding the heat loss at the converter 13, is considered to be the energy which is input to the inverters 14 and 15, so the output energy acquisition part 24 receives as input the electric power value which is input to the inverters 14 and 15. The energy which is output from the inverters 14 and 15, if excluding the heat loss at the inverters 14 and 15, is considered to be the energy which is input to the motors M1 and M2. The output energy acquisition part 24 receives as input the electric power value which is input to the motors M1 and M2.

The heat radiation characteristic estimation part 25 estimates the heat radiation characteristic of the component elements from the temperatures of the component elements, ambient temperature, input energy, and output energy which were input from the temperature acquisition part 21, ambient temperature acquisition part 22, input energy acquisition part 23, and output energy acquisition part 24 (step 205). Further, the heat radiation characteristic of the component elements which was estimated by the heat radiation characteristic estimation part 25 is output by the heat radiation characteristic outputting part 26 as a normal/abnormal judgment signal of the cooling device.

Figure 3:
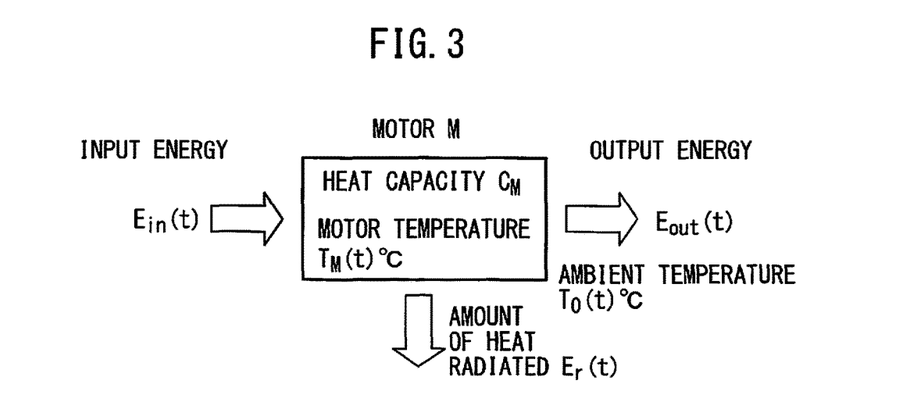
FIG. 3 is a view of an input/output relationship which explains a method of estimating a heat radiation characteristic in a heat radiation characteristic estimation part of the numerical control device which is shown in FIG. 1 giving motors as an example.

Next, the method by which the heat radiation characteristic estimation part 25 which is shown in FIG. 1 estimates the heat radiation characteristic (heat radiation coefficient K) will be explained with reference to a motor M as an example. As shown in FIG. 3, when making the input energy which is input to a motor M the value Ein(t), the output energy (rotational energy) which is output from the motor M is made the value Eout(t). This being so, the loss energy Eloss(t) at the inside of the motor M at this time is shown by formula 1.

$$E_{loss}(t) = E_{in}(t) - E_{out}(t) \quad \text{(formula 1)}$$

On the other hand, the input energy Ein(t) which is input to the motor M, as shown in formula 2, is calculated from the product of the input voltage Vin(t) which is applied to the motor M and the input current Iin(t) which is supplied to the motor M. Further, the output energy Eout(t) which is output from the motor M, as shown in formula 3, is expressed by the rotational energy or work per unit time. In the case of a converter, inverter, etc., as shown in formula 3', it is expressed as the product of the output voltage Vout(t) and output current Iout(t). In formula 3, J is the inertia, ω(t) is the angular velocity, and Trq(t) is the torque.

$$E_{in}(t) = I_{in}(t) \cdot V_{in}(t) \quad \text{(formula 2)}$$

$$E_{out}(t) = J\omega(t)\frac{d\omega(t)}{dt} = Trq(t) \cdot \omega(t) \quad \text{(formula 3)}$$

$$E'_{out}(t) = I_{out}(t) \cdot V_{out}(t) \quad \text{(formula 3')}$$

(J: inertia, ω(t): angular velocity, Trq(t): torque)

Part of the loss energy Eloss(t) is discharged to the outside in accordance with the difference between the motor temperature TM(t) and the ambient temperature T0(t). The remaining energy is stored as heat energy at the inside of the motor M. The amount of heat radiated Er(t) which is discharged to the outside is expressed by formula 4 and is generally calculated by multiplying the heat radiation coefficient K with the difference between the motor temperature TM(t) and the ambient temperature T0(t).

$$E_r(t) = K(T_M(t) - T_0(t)) \quad \text{(formula 4)}$$

Therefore, the heat energy Eh1(t) at the inside of the motor M, as shown in formula 5, can be calculated by subtracting the amount of heat radiated Er(t) from the loss energy Eloss(t).

$$E_{h1}(t) = E_{loss}(t) - E_r(t) \quad \text{(formula 5)}$$

On the other hand, the cumulative value of the heat energy Eh2(t) at the inside of the motor M when the time changes from t0 to t can be calculated by multiplying the heat capacity CM with the difference (TM(t)−TM(t0)) in the temperature of the motor M as shown in formula 6.

$$\int_{t_0}^{t} E_{h2}(t) = C_M(T_M(t) - T_M(t_0)) \quad \text{(formula 6)}$$

Further, if differentiating formula 6, as shown in formula 7, it is possible to calculate the heat energy Eh2(t) at the inside of the motor M per unit time.

$$E_{h2}(t) = C_M \cdot \frac{dT_M(t)}{dt} \quad \text{(formula 7)}$$

The heat energy Eh1(t) is the heat energy which is calculated from the input/output relationship of energy at the inside of the motor M, while the heat energy Eh2(t) is the heat energy which is calculated from the temperature potential at the inside of the motor M. Therefore, the heat energies Eh1(t) and Eh2(t) are believed to become substantially equal, so the relationship of formula 8 stands.

From $$E_{h1}(t) = E_{h2}(t), \ E_{h1}(t) = E_{loss}(t) - E_r(t), \quad \text{(formula 1), (formula 4)}$$

$$(E_{in} - E_{out}) - K(T_M(t) - T_0(t)) = C_M \cdot \frac{dT_M(t)}{dt} \quad \text{(formula 8)}$$

Therefore, the heat radiation characteristic (heat radiation coefficient K) can be calculated by solving formula 8 for the heat radiation coefficient K as shown in formula 9.

$$K = \frac{(E_{in}(t) - E_{out}(t)) - C_M \frac{d}{dt} T_M(t)}{T_M(t) - T_0(t)} \quad \text{(formula 9)}$$

For this reason, the present invention uses the input energy Ein(Δt·n) per unit time Δt which is acquired at the input energy acquisition part 23, the output energy Eout (Δt·n) per unit time Δt which is acquired at the output energy acquisition part 24, the motor temperature TM(t) which is acquired at the temperature acquisition part 21, and the ambient temperature T0(t) which is detected at the ambient temperature acquisition part 22 as the basis to calculate the heat radiation coefficient K of the component elements being monitored. The heat radiation coefficient K shows the cooling capacity of the component elements including the cooling device of the cooling fan motor 11. If trouble in the cooling fan motor 11 causes the cooling capacity to fall, the value of the heat radiation coefficient K becomes smaller. On the other hand, when the cooling fan motor 11 is operating normally, the value of the heat radiation coefficient K is a substantially constant value, so this becomes an effective indicator in confirming the heat radiation characteristic of the component elements.

Here, the heat radiation coefficient K is calculated every unit time Δt, but it is possible to further calculate the radiation coefficient K by a slightly longer time unit (longer span) and the average value Kavg of the heat radiation coefficients K which were calculated every unit time Δt to view the cooling capacity of the component elements.

Here, the calculation of the loss energy using the resistance value will be explained. The energy Ein which is supplied to the motor M per unit time Δt can be calculated by multiplying the input voltage V and the input current I. Part of Ein is converted to the rotational energy (output energy) Eout of the motor, while the remaining energy is consumed at the inside of the motor M as the loss amount Eloss. The loss amount Eloss is mainly the amount of consumption per unit time Δt mainly by the winding resistance R of the motor M. It is expressed by formula 10 and consumed as heat energy. Therefore, the energy which is consumed by the winding resistance R can utilized for calculation of the heat radiation coefficient K as the loss energy Eloss.

Further, if current flows to the motor M and thereby electrical energy E1 is supplied, the loss energy Eloss is expressed by the function Eloss (I(t)) of the current I. Therefore, when the relationship of the square value of the current and the heat generation is a proportional relationship, it is also possible, such as shown in formula 11, to multiply the current I(t)² with the heat generation coefficient H for each of the component elements to calculate the loss energy Eloss(I(t)).

$$E_{loss} = R \times I(t)^2 \quad \text{(formula 10)}$$

$$E_{loss} = H \times I(t)^2 \quad \text{(formula 11)}$$

Figure 4:
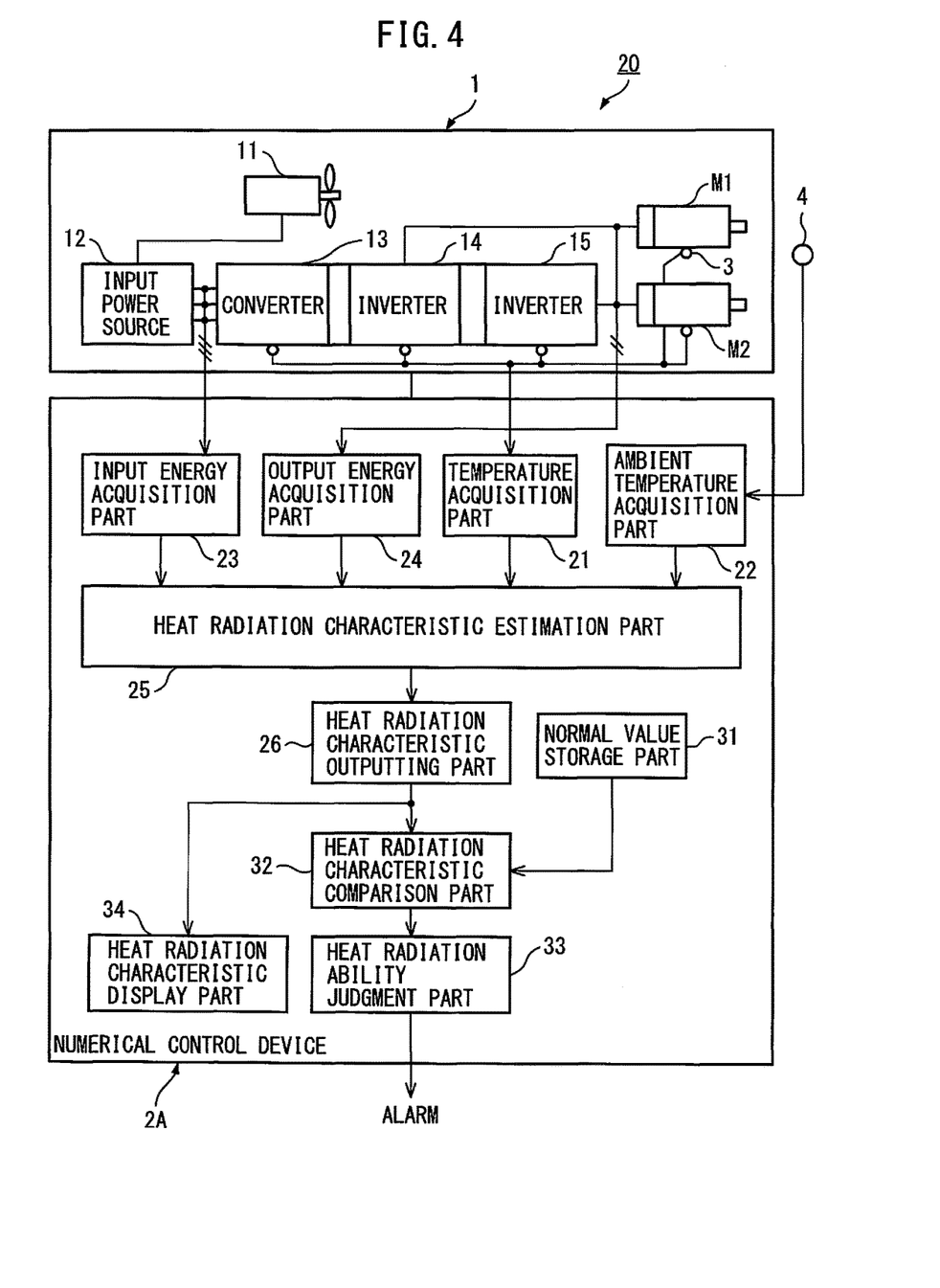
FIG. 4 is a block diagram of a motor drive system which is provided with a numerical control device of a second embodiment of the present invention.

Next, a motor drive system 20 which is provided with a numerical control device 2A of the present invention which outputs an alarm when the heat radiation characteristic of the component elements at the motor part 1 falls will be explained. FIG. 4 shows a motor drive system 20 of a second embodiment of the present invention. The configuration of the motor part 1 is the same as the configuration of the motor part 1 of the motor drive system 10 of the first embodiment which is explained in FIG. 1. On the other hand, the numerical control device 2A of the second embodiment, like the numerical control device 2 of the first embodiment, is provided with a temperature acquisition part 21, ambient temperature acquisition part 22, input energy acquisition part 23, output energy acquisition part 24, heat radiation characteristic estimation part 25, and heat radiation characteristic outputting part 26. These configurations and operations are similar to those of the first embodiment, so the same component members will be assigned the same reference notations and explanations will be omitted.

The numerical control device 2A of the second embodiment is provided with, behind the heat radiation characteristic outputting part 26 of the numerical control device 2 of the first embodiment, a normal value storage part 31, heat radiation characteristic comparison part 32, heat radiation ability judgment part 33, and heat radiation characteristic display part 34. The normal value storage part 31 stores the heat radiation characteristic Kn of the component elements when the cooling device of the component elements of the motor part 1 is operating normally linked with the ambient temperature of the motor part 1. The normal value storage part 31 may also store a preset upper limit value Km of the heat radiation characteristic K corresponding to the ambient temperature of the motor part 1 instead of the normal value Kn of heat radiation characteristic of the component elements when the cooling device of the component elements of the motor part 1 is normally operating. The heat radiation characteristic comparison part 32 is connected with the heat radiation characteristic outputting part 26 and normal value storage part 31. The output of the heat radiation characteristic comparison part 32 is input to the heat radiation ability judgment part 33.

Figure 5:
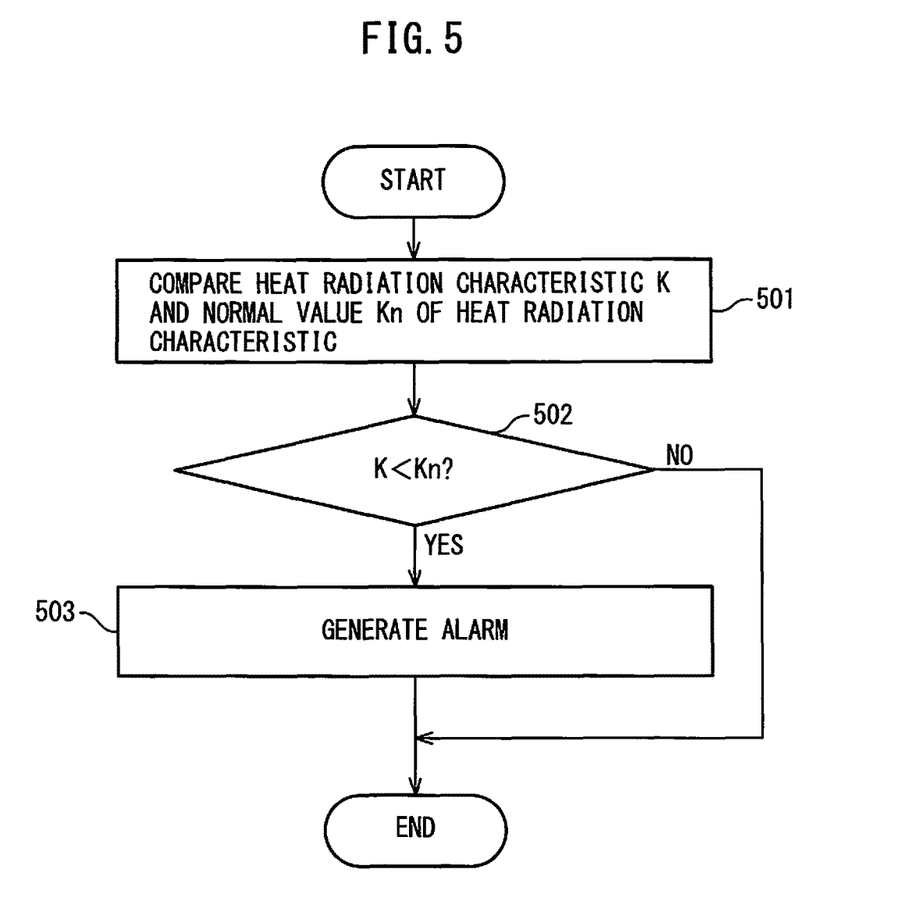
FIG. 5 is a flow chart which shows an example of the operations of a heat radiation characteristic comparison part and heat radiation ability judgment part which are shown in FIG. 4.

FIG. 5 is a flow chart which shows one example of the operations of the heat radiation characteristic comparison part 32 and heat radiation ability judgment part 33 which are shown in FIG. 4. The heat radiation characteristic comparison part 32 receives as input the heat radiation characteristic K (estimated value) from the heat radiation characteristic outputting part 26 and the data of the ambient temperature at the time of estimation and receives as input the normal value Kn of the heat radiation characteristic corresponding to the data of this ambient temperature from the normal value storage part 31. The heat radiation characteristic comparison part 32 compares the heat radiation characteristic K from the heat radiation characteristic outputting part 26 and the normal value Kn of the heat radiation characteristic from the normal value storage part 31 and inputs the result of comparison to the heat radiation ability judgment part 33 (step 501).

The heat radiation ability judgment part 33 ends the processing without doing anything when the heat radiation characteristic K from the heat radiation characteristic outputting part 26 is the greater or equal to the normal value Kn of the heat radiation characteristic from the normal value storage part 31 (step 502). On the other hand, the heat radiation ability judgment part 33 judges that the cooling fan motor 11 is abnormal and generates an alarm when the heat radiation characteristic K from the heat radiation characteristic outputting part 26 is smaller than the normal value Kn of the heat radiation characteristic from the normal value storage part 31 (YES) (step 503). When K<Kn at step 502, the cooling efficiency of the cooling fan motor 11 falls. If the data which is stored in the normal value storage part 31 is the upper limit value Km when the cooling device of component elements of the motor part 1 is operating normally, when K<Km at step 502, the heat radiation ability judgment part 33 generates an alarm at step 503.

Figure 6:
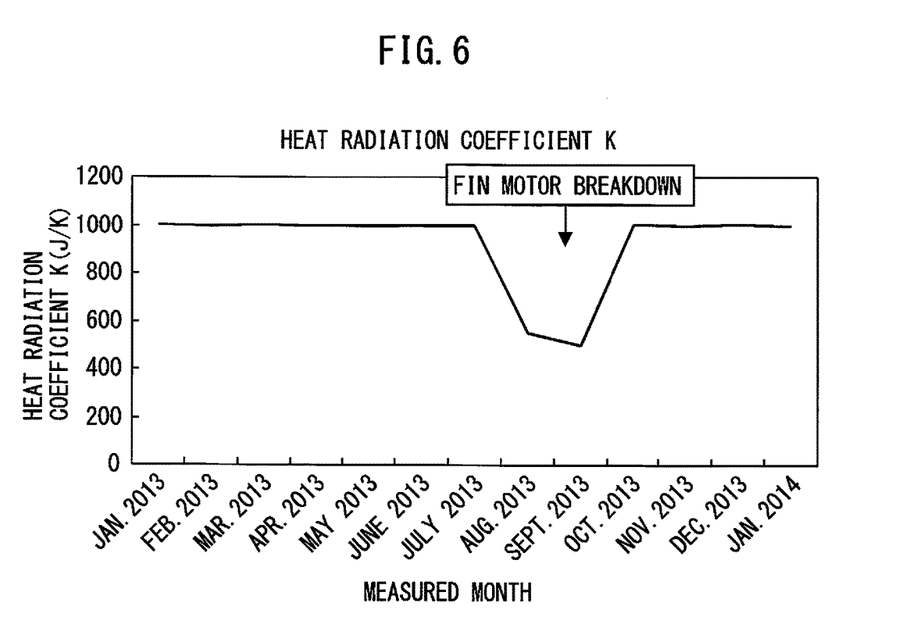
FIG. 6 is a view which shows an example of display of trouble in a fan motor on a display screen of a heat radiation characteristic display part which is shown in FIG. 4.

Further, the numerical control device 2A of the second embodiment is provided with a heat radiation characteristic display part 34 which is provided with a display screen, so the heat radiation characteristic display part 34 can be used to display the heat radiation characteristic K which is output from the heat radiation characteristic outputting part 26 at the screen. FIG. 6 shows one example of the trends in the heat radiation characteristic (heat radiation coefficient) K which is displayed at the heat radiation characteristic display part 34. By providing the heat radiation characteristic display part 34 in this way, it is possible to monitor the heat radiation characteristic.

By monitoring the heat radiation characteristic (heat radiation coefficient) K, it is possible to predict in advance a drop in the amount of heat radiated Er(t) (drop in cooling efficiency) due to trouble in the cooling fan motor 11 etc. in advance. Due to this, it becomes possible to prevent in advance the excessive rise in temperature of the component elements due to trouble in the cooling fan motor 11. In the example of display of the screen which is shown in FIG. 6, from the characteristic of the heat radiation coefficient K which was calculated every month, it is learned that the cooling fan motor 11 which had functioned normally up to July 2013 broke down in August. Further, it can be confirmed that it was repaired in October and the cooling ability of the cooling fan motor 11 returned to normal. By monitoring the heat radiation characteristic K every predetermined time period in this way, it is possible to discover trouble in the cooling fan motor 11 at an early stage and prevent trouble due to overheating of the component elements of the motor part 1, so large damage is not incurred.

Above, the present invention was explained with reference to the case where the cooling device of the component elements in the motor part of the motor drive system is an air-cooling type which is provided with a cooling fan motor, but even if the cooling device is a liquid-cooling type, it is possible to estimate the drop in the heat radiation characteristic due to the slowdown of circulation of the cooling medium and thereby prevent trouble due to overheating of the component elements in the motor part of the motor drive system.

Above, the present invention was explained with reference to preferred embodiments, but a person skilled in the art would understand that various modifications and changes can be made without departing from the scope of the later explained claims.

What is claimed is:

1. A numerical control device which is provided at a motor drive system which is provided with a cooling device and drives at least one motor, said numerical control device comprising:
a processor, wherein the processor comprises:
a temperature acquisition part which acquires a temperature of component elements at a motor part of said motor drive system from a temperature detector which is set in the motor drive system,
an ambient temperature acquisition part which acquires an ambient temperature of the motor part of the motor drive system from a temperature detector which is set at the motor drive system,
an input energy acquisition part which acquires an input energy to the component elements,
an output energy acquisition part which acquires an output energy from the component elements,
a heat radiation characteristic estimation part which estimates a heat radiation characteristic of the component elements from the temperature of the component elements, the ambient temperature, the input energy, and the output energy, and
a heat radiation characteristic outputting part which outputs the estimated heat radiation characteristic of the component elements as a normal/abnormal judgment signal of the cooling device wherein
the numerical control device is configured to monitor an uptime and a downtime of the cooling device based on the normal/abnormal judgment signal,
wherein said heat radiation characteristic estimation part subtracts a value for heat energy of said component elements which is calculated from the temperature of said component elements and heat capacity from loss energy of said component elements which is calculated by subtracting said output energy from said input energy to thereby calculate an amount of heat radiated from said component elements and divides said amount of heat radiated by a temperature difference of a temperature of said component elements and a temperature of said ambient temperature so as to calculate a heat radiation characteristic of said component elements.

2. The numerical control device according to claim 1, further comprising:
a normal value storage part which stores a normal value of the heat radiation characteristic of said component elements,
a heat radiation characteristic comparison part which compares said estimated value of the heat radiation characteristic of said component elements which is output from the heat radiation characteristic outputting part with the normal value which is stored in said normal value storage part, and
a heat radiation ability judgment part which judges that said cooling device is abnormal and outputs an alarm when said estimated value is lower than said normal value.

3. The numerical control device according to claim 2, wherein
said estimated value of the heat radiation characteristic of said component elements which is output from the heat radiation characteristic outputting part includes data on the ambient temperature at the time of estimation,
said normal value storage part stores said normal value linked with the ambient temperature of said component elements, and
said heat radiation characteristic comparison part compares the estimated value of the heat radiation characteristic of said component elements which is output from said heat radiation characteristic outputting part with the normal value at the corresponding ambient temperature.

4. The numerical control device according to claim 2, wherein said normal value storage part stores an upper limit value of the heat radiation characteristic of said component elements instead of a normal value of the heat radiation characteristic of said component elements.

5. The numerical control device according to claim 1, further comprising a heat radiation characteristic display part which is connected to said heat radiation characteristic outputting part and displays said heat radiation characteristic of the component elements.

6. The numerical control device according to claim 1, wherein said cooling device is an air-cooling type and is provided with a cooling fan motor which generates cooling air.

\* \* \* \* \*